(12) United States Patent
Kim et al.

(10) Patent No.: US 9,014,078 B2
(45) Date of Patent: Apr. 21, 2015

(54) METHOD AND APPARATUS FOR MULTICASTING A MEDIUM ACCESS CONTROL (MAC) CONTROL MESSAGE IN WIRELESS ACCESS SYSTEM

(75) Inventors: Jeongki Kim, Anyang-si (KR); Jinsam Kwak, Anyang-si (KR); Giwon Park, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/357,750

(22) PCT Filed: Jul. 13, 2012

(86) PCT No.: PCT/KR2012/005600
§ 371 (c)(1),
(2), (4) Date: May 12, 2014

(87) PCT Pub. No.: WO2013/085127
PCT Pub. Date: Jun. 13, 2013

(65) Prior Publication Data
US 2014/0307618 A1 Oct. 16, 2014

Related U.S. Application Data

(60) Provisional application No. 61/568,157, filed on Dec. 8, 2011.

(30) Foreign Application Priority Data

Mar. 29, 2012 (KR) .................. 10-2012-0032345

(51) Int. Cl.
*H04H 20/71* (2008.01)
*H04L 12/18* (2006.01)
(Continued)

(52) U.S. Cl.
CPC ............. *H04L 12/189* (2013.01); *H04W 4/06* (2013.01); *H04W 4/005* (2013.01); *H04W 72/0406* (2013.01)

(58) Field of Classification Search
USPC .................... 370/312, 320–339, 390
See application file for complete search history.

(56) References Cited

U.S. PATENT DOCUMENTS

2014/0293861 A1* 10/2014 Kim et al. .................. 370/312

OTHER PUBLICATIONS

Agiwal et al, Multicast M2M MAC Control Messages, IEEE, 5 pages, Jan. 6, 2012.*

(Continued)

*Primary Examiner* — Frank Duong
(74) *Attorney, Agent, or Firm* — Lee, Hong, Degerman, Kang & Waimey

(57) ABSTRACT

A wireless access system supporting an M2M environment and, more particularly, a method and apparatus for multicasting a MAC control message respective to an M2M device is disclosed herein. According to an exemplary embodiment, a method for multicasting a MAC control message may include the steps of receiving a paging message including an MGID identifying an M2M group to which the corresponding M2M device belongs and an indicator indicating a multicast data transmission for the M2M device, receiving an M2M MA A-MAP IE including resource assignment information indicating a resource region to which the MAC control message respective to the corresponding M2M device is being transmitted, and, when a CRC bit being masked to the M2M MA A-MAP IE includes the MGID, receiving a MAC PDU being accompanied by the MAC control message being multicast through the resource region indicated by the resource assignment information.

20 Claims, 6 Drawing Sheets

(51) Int. Cl.
*H04W 4/06* (2009.01)
*H04W 4/00* (2009.01)
*H04W 72/04* (2009.01)

(56) References Cited

OTHER PUBLICATIONS

Kim et al, Multicast transmission end indication for M2M devices in idle mode, IEEE, 4 pages, Jul. 9, 2011.*

Kim, et al., "Multicast transmission in IEEE P802.16p," IEEE 802.16 Broadband Wireless Access Working Group, IEEE 802.16p-11/0315, Nov. 2011, 4 pages.

Colban, et al., "MGID Related Corrections," IEEE 802.16 Broadband Wireless Access Working Group, IEEE C802.16p-11/0337r2, Nov. 2011, 6 pages.

Nigam, "MGID Harmonization," IEEE 802.16 Broadband Wireless Access Working Group, IEEE C802.16p-11/0287r1, Nov. 2011, 10 pages.

Agiwal, et al., "MGID, CID and Service flows," IEEE 802.16 Broadband Wireless Access Working Group, IEEE C80216p-11/0290, Nov. 2011, 4 pages.

PCT International Application No. PCT/KR2012/005600, Written Opinion of the International Searching Authority dated Jan. 23, 2013, 9 pages.

* cited by examiner

METHOD AND APPARATUS FOR MULTICASTING A MEDIUM ACCESS CONTROL (MAC) CONTROL MESSAGE IN WIRELESS ACCESS SYSTEM

CROSS-REFERENCE TO RELATED APPLICATIONS

This application is the National Stage filing under 35 U.S.C. 371 of International Application No. PCT/KR2012/005600, filed on Jul. 13, 2012, which claims the benefit of earlier filing date and right of priority to Korean Application No. 10-2012-0032345, filed on Mar. 29, 2012, and also claims the benefit of U.S. Provisional Application No. 61/568,157, filed on Dec. 8, 2011, the contents of which are all hereby incorporated by reference herein in their entirety.

FIELD OF THE INVENTION

The present invention relates a wireless access system supporting an M2M environment and, more particularly, to a method and apparatus for multicasting a medium access control (MAC) message.

RELATED ART OF THE FIELD

Hereinafter, a Machine to Machine environment according to the present invention will be briefly described.

Herein, a M2M (Machine to Machine) literally refers to a communication between an electronic device (or machine) and another electronic device (or machine). As a broader definition, M2M refers to a wireless or wired communication between electronic devices, or to a communication between a user-controlled device and a machine. However, recently, M2M has generally been defined as a wireless communication between an electronic device and another electronic device without any human involvement.

When the concept of M2M communication was first adopted in the early 1990's, M2M communication was merely understood and recognized as the concept of remotely controlled communication or telematics, and the related market was also limited to such concept. However, over the past few years, M2M communication has been under development at a remarkable rate and has now evolved to a market drawing worldwide attention. Most particularly, the M2M communication has greatly influenced diverse fields including Fleet Management, remote monitoring of devices and equipments, smart meter for measuring the operation time of a construction equipment installation and for automatically measuring the usage amount of heat or electricity in an applied market related to the POS (Point of Sales) and security. The M2M communication that is to be used in the future is expected to be used and applied for a wider scope of usage in association with the conventional mobile communication and high speed wireless internet or low power communication solutions, such as Wi-Fi and Zigbee, thereby becoming the basis for expanding its market domain to the B2C (Business to Customer) market, and not being limited only to the B2B (Business to Business) market.

In the age of M2M communication, all types of machines (or devices) equipped with a SIM (Subscriber Identity Module) card may perform data reception and transmission, thereby being capable of being remotely controlled and managed. For example, being applied to an extended range of devices and equipments, such as cars, trucks, trains, containers, vending machines, gas tanks, and so on, the M2M communication technology may be applied to an enormous range of application.

In the related art, a user equipment was generally managed in individual units. Therefore, a one-to-one communication was generally performed between a base station and a user equipment. For example, when it is assumed that a large number of M2M devices (or machines) each performs a one-to-one communication with the base station, a network overload is expected to occur due to an excessive amount signaling that is generated between each of the M2M devices and the base station. As described above, when the M2M communication is being extended and being performed at a vast range, an overhead occurring during the communication between the M2M devices or between the each of the M2M devices and the base station may become a problem.

Also, as the usage of the M2M devices is becoming more active, an environment having the general user equipments co-exist with the M2M devices may be configured. Therefore, when the conventional communication is used without any modification, a problem may occur in that the user equipment is be required to decode all of the messages respective to the M2M devices.

For example, if broadcast data or multicast data are transmitted from the base station as one-to-many messages, without any distinction between the M2M devices and the general user equipment, the general user equipment and the M2M devices are required to decode all of the broadcast data. Therefore, the power consumption level may be increased abruptly. Furthermore, the user equipment or each of the M2M devices may fail to receive the data, which the corresponding user equipment or the corresponding M2M device was initially intended to receive.

Additionally, since the MAC control messages, which are being transmitted with respect to the M2M devices, are transmitted in a broadcast format, even when a transmitted MAC control message (e.g., AAI-MTE-IND, AAI-MGMC) does not correspond to a message respective to a M2M group, to which the corresponding M2M device belongs, the M2M device may first decode a burst respective to the AAI-MTE-IND message. Then, after verifying (or determining) an MGID included in the MAC control message, the M2M device is required to perform a process of verifying (or determining) whether or not the corresponding M2M device group is the M2M device group, to which the corresponding M2M device belongs.

In this case, at the point when the base station is to transmit the MAC control messages, when the corresponding messages include only the information respective to a single M2M group, other M2M devices that do not belong to the corresponding group and other general user equipment may have to receive unnecessary MAC control messages.

DETAILED DESCRIPTION OF THE INVENTION

Technical Objects

In order to resolve the above-described general technical problems, an object of the present invention is to provide an efficient communication method for M2M devices.

Another object of the present invention is to define M2M device specific messages and to provide a method for transmitting such messages.

Another object of the present invention is to provide a method for allowing a M2M device to receive only the MAC control messages for the M2M group, to which the corresponding M2M device belongs.

Another object of the present invention is to provide a method for transmitting MAC control messages in a multicast manner in order to reduce unnecessary burst decoding overhead of the general user equipments and also to reduce unnecessary operations of the M2M devices.

A further object of the present invention is to provide methods for efficiently broadcasting dedicated messages for M2M devices by separating general user equipments and M2M devices, while ensuring maximum backward compatibility with the conventional technology.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

TECHNICAL SOLUTIONS

To achieve these objects and other advantages and in accordance with the purpose of the invention, as embodied and broadly described herein, being relates to a wireless access system supporting an M2M environment, the present invention provides a method and apparatus for multicasting a Medium Access Control (MAC) control message. In an aspect of the present invention, a method for multicasting a Medium Access Control (MAC) control message may comprises steps of receiving a paging message including an M2M Group Identifier (MGID) and an indicator, wherein the M2M Group Identifier (MGID) identifies an M2M group to which the M2M device belongs and the indicator indicates a multicast data transmission for the M2M device; receiving an M2M multicast assignment A-MAP information element (M2M MA A-MAP IE) including resource assignment information, wherein the resource assignment information indicates a resource region to which the MAC control message for the M2M device is being transmitted; and receiving a Medium Access Control Protocol Data Unit (MAC PDU) including the MAC control message, the MAC control message being multicast through the resource region indicated by the resource assignment information, when a Cyclic Redundancy Check (CRC) bit being masked to the M2M MA A-MAP IE includes the MGID. In this case, the CRC bit being masked to the M2M MA A-MAP is configured with a masking prefix, a type indicator, and the MGID and a MAC header of the MAC PDU includes a first flow identifier indicating whether a payload of the MAC PDU is encrypted.

In another aspect of the present invention, a method for multicasting a Medium Access Control (MAC) control message may comprises steps of transmitting a paging message including an M2M Group Identifier (MGID) and an indicator, wherein the M2M Group Identifier (MGID) identifies an M2M group to which the M2M device belongs, and wherein the indicator indicates a multicast data transmission for the M2M device; transmitting an M2M multicast assignment A-MAP information element (M2M MA A-MAP IE) including resource assignment information, wherein the resource assignment information indicates a resource region to which the MAC control message for the M2M device is being transmitted; and transmitting a Medium Access Control Protocol Data Unit (MAC PDU) including the MAC control message, the MAC control message being multicast through the resource region indicated by the resource assignment information, when a Cyclic Redundancy Check (CRC) bit being masked to the M2M MA A-MAP IE includes the MGID. In this case, the CRC bit being masked to the M2M MA A-MAP is configured with a masking prefix, a type indicator, and the MGID and a MAC header of the MAC PDU includes a first flow identifier indicating whether a payload of the MAC PDU is encrypted.

In yet another aspect of the present invention, a M2M device for receiving a Medium Access Control (MAC) control message in a wireless access system, the M2M device comprises a receiver and a processor supporting the reception of the MAC control message.

At this point, the M2M device is configured to receive a paging message including an M2M Group Identifier (MGID) and an indicator through the receiver, wherein the M2M Group Identifier (MGID) identifies an M2M group to which the M2M device belongs and the indicator indicates a multicast data transmission for the M2M device; receive an M2M multicast assignment A-MAP information element (M2M MA A-MAP IE) including resource assignment information through the receiver, wherein the resource assignment information indicates a resource region to which the MAC control message for the M2M device is being transmitted; and receive a Medium Access Control Protocol Data Unit (MAC PDU) including the MAC control message through the receiver, the MAC control message being multicast through the resource region indicated by the resource assignment information, when a Cyclic Redundancy Check (CRC) bit being masked to the M2M MA A-MAP IE includes the MGID. In this case, the CRC bit being masked to the M2M MA A-MAP is configured with a masking prefix, a type indicator, and the MGID and a MAC header of the MAC PDU includes a first flow identifier indicating whether a payload of the MAC PDU is encrypted.

In a further aspect of the present invention, a base station for multicasting a Medium Access Control (MAC) control message, the base station comprises a transmitter and a processor supporting the transmission of the MAC control message.

At this point, the base station is configured to transmit a paging message including an M2M Group Identifier (MGID) and an indicator through the transmitter, wherein the M2M Group Identifier (MGID) identifies an M2M group to which the M2M device belongs, and wherein the indicator indicates a multicast data transmission for the M2M device; transmit an M2M multicast assignment A-MAP information element (M2M MA A-MAP IE) including resource assignment information through the transmitter, wherein the resource assignment information indicates a resource region to which the MAC control message for the M2M device is being transmitted; and transmit a Medium Access Control Protocol Data Unit (MAC PDU) including the MAC control message through the transmitter, the MAC control message being multicast through the resource region indicated by the resource assignment information, when a Cyclic Redundancy Check (CRC) bit being masked to the M2M MA A-MAP IE includes the MGID. In this case, the CRC bit being masked to the M2M MA A-MAP is configured with a masking prefix, a type indicator, and the MGID and a MAC header of the MAC PDU includes a first flow identifier indicating whether a payload of the MAC PDU is encrypted.

In the various aspects of the present invention, the first flow identifier may further indicate that the MAC PDU is a MAC control message being transmitted as multicast manner, and the first flow identifier may be set to 0b0000 or 0b0001 in order to indicate whether or not the encryption has been performed.

After receiving the paging message, the M2M device may receive a MAC PDU accompanying multicast data. At this point, the MAC PDU may include a second flow identifier indicating that the MAC PDU is the multicast data, and the second flow identifier may be assigned with a value of 0b0100.

The MAC control message is a multicast transmission end indicator (AAI-MTE-IND) message indicating a transmission end of the multicast data or to an AII-MGMC message for assigning a new M2M group identifier.

When the first flow identifier indicates that the MAC PDU has been encrypted, the M2M device may further perform a process of decrypting the MAC PDU.

The above-described embodiments of the present invention are merely a portion of the preferred embodiments of the present invention. And, it is to be understood that both the foregoing general description and the following detailed description of the present invention are exemplary and explanatory and are intended to provide further explanation of the invention as claimed.

Advantageous Effects

According to the embodiments of the present invention, the present invention has the following advantages.

Firstly, multicast data may be efficiently transmitted with respect to an M2M device. Secondly, even if the corresponding device corresponds to an M2M device, by enabling the device to receive only the MAC control message respective to the M2M group, to which the corresponding device belongs, and by enabling the device to not receive the MAC control messages respective to other M2M groups, an unnecessary data reception process may be omitted.

Thirdly, by transmitting the MAC control messages in multicast manner, unnecessary burst decoding overhead of general user equipments may be reduced, and unnecessary operations of the M2M devices may also be reduced.

Finally, while ensuring maximum backward compatibility with the conventional technology, the present invention may differentiate the general user equipments from the M2M device, so that the M2M device specific messages can be efficiently broadcasted.

Additional advantages, objects, and characteristics of the present application will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are included to provide a further understanding of the invention and which are incorporated in and constitute a part of this application, illustrate embodiment(s) of the invention and together with the description serve to explain the principle of the invention.

BEST MODE FOR CARRYING OUT THE PRESENT INVENTION

Figure 1:
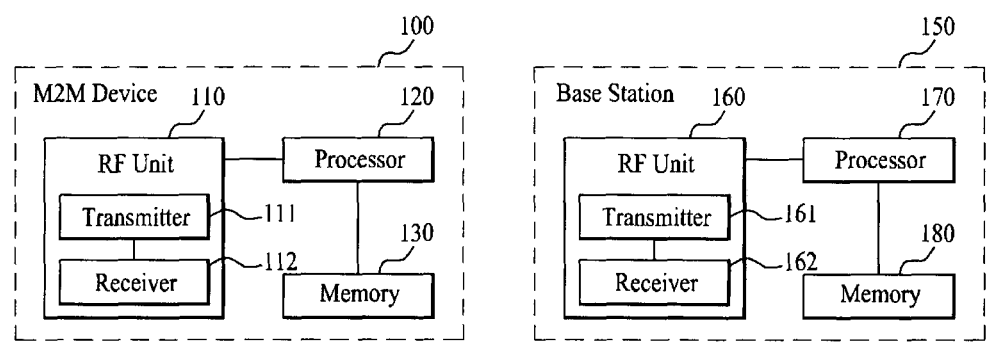
FIG. 1 illustrates a general view showing the configuration of devices, such as an M2M device, a base station, and so on, according to an exemplary embodiment of the present invention.

The exemplary embodiments of the present invention provide a method and apparatus for multicasting a Medium Access Control (MAC) control message in a wireless access system supporting the M2M environment.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In order to avoid any ambiguity in the concept (or idea) of the present invention, some of the structures and devices disclosed (or mentioned) in the present invention may be omitted from the description of the accompanying drawings of the present invention. Also, any procedure or step that can be easily understood by anyone skilled in the art has also been excluded from the description of the present invention.

In the description of the present invention, the embodiments of the present invention will be described by mainly focusing on the data transmission and reception relation between a base station and a mobile station. Herein, the base station may refer to a terminal node of the network that performs direct communication with the mobile station. Occasionally, in the description of the present invention, particular operations of the present invention that are described as being performed by the base station may also be performed by an upper node of the base station.

More specifically, in a network consisting of multiple network nodes including the base station, diverse operations that are performed in order to communicate with the terminal may be performed by the base station or network nodes other than the base station. Herein, the term 'Base Station (BS)' may be replaced by other terms, such as fixed station, Node B, eNode B (eNB), ABS (Advanced Base Station), or Access Point (AP).

Additionally, the term ' MS (Mobile Station)' may be replaced by terms including UE (User Equipment), SS (Subscriber Station), MSS (Mobile Subscriber Station), Mobile Terminal, AMS (Advanced Mobile Station) or Terminal.

Most particularly, in the description of the present invention, the mobile station may be used to have the same meaning as the M2M device.

Additionally, the transmitting end refers to a fixed and/or mobile node providing data services or audio services (or voice services), and the receiving end refers to a fixed and/or mobile node receiving data services or audio services (or voice services). Therefore, in an uplink, the mobile station may become the transmitting end, and the base station may become the receiving end. And, similarly, in a downlink, the mobile station may become the receiving end, and the base station may become the transmitting end.

The exemplary embodiments of the present invention may be supported by the standard documents that are disclosed in at least any one of the diverse wireless access systems, such as an IEEE 802.xx system, a 3GPP system, a 3GPP LTE system, and a 3GPP2 system. More specifically, among the exemplary embodiments of the present invention, reference may be made to the above-mentioned documents for the description of obvious process steps or elements of the present invention that have not been described herein.

Furthermore, all of the terms mentioned in the description of the present invention may be described and defined with reference to the standard documents. Most particularly, the exemplary embodiments of the present invention may be supported by at least one or more of the P802.16e-2004, P802.16e-2005, P802.16m, P802.16p, and P802.16.1b standard documents, which correspond to the standard documents for the IEEE 802.16 system.

Hereinafter, the preferred embodiments of the present invention will be described in detail with reference to the accompanying drawings. The detailed description of the present invention that is disclosed as follows with reference to the accompanying drawings is merely the description of exemplary embodiments of the present invention. And, therefore, the description of the present invention does not seek to represent a unique embodiment of the present invention.

Reference will now be made in detail to the preferred embodiments of the present invention, examples of which are illustrated in the accompanying drawings, so that anyone skilled in the art can easily implement the embodiments of the present invention. However, it will be apparent that the present invention may be implemented in a variety of different structures, and, therefore, the present invention will not be limited only to the exemplary embodiments presented herein. Furthermore, in the accompanying drawings, in order to clearly describe the embodiments of the present invention, any parts irrelevant to the description of the present invention will be omitted. And, wherever possible, similar reference numbers will be used throughout the drawings to refer to the same or like parts.

Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", " . . . module", and so on, which are indicated in the description of the present invention, indicates units that process at least one function or operation. And, this may be realized in the form of hardware or software, or a combination of hardware and software.

The specific terms used in the following embodiments of the present invention are provided to facilitate the understanding of the present invention. And, therefore, without deviating from the technical scope and spirit of the present invention, such specific terms may also be varied and/or replaced by other terms.

1. M2M Devices in General

Hereinafter, communication between M2M devices refers to a communication format, which is performed between user equipments passing through (or being connected with) the base station, or which is performed between a base station and user equipments without any human involvement, or refers to a communication format, which is performed between M2M devices. Therefore, an M2M Device refers to a user equipment that may be provided with support for performing communication with the above-described M2M devices.

An access service network for M2M services may be defined as an M2M ASN (M2M Access Service Network), and a network entity communicating with the M2M devices may be referred to as an M2M server. Herein, the M2M server performs M2M application and provides an M2M specific service for one or more M2M devices. An M2M feature corresponds to a characteristic (or feature) of an M2M application. And, herein, at least one or more features (or characteristics) are required for providing an application. An M2M device group refers to a group of M2M devices sharing at least one or more common characteristics (or features).

Within a consistent network, a number of devices communicating via M2M communication (i.e., such devices may be diversely referred to as M2M devices, M2M communication devices, MTC (Machine Type Communication) devices, and so on) may gradually increase in accordance with an increase in the respective Machine Application Type.

Herein, the Machine Application Types may include (1) security, (2) public safety, (3) tracking and tracing, (4) payment, (5) healthcare, (6) remote maintenance and control, (7) metering, (8) consumer device, (9) Fleet Management in an application market related to POS (Point of Sales) and security, (10) communication between devices in Vending Machines, (11) remote monitoring of machines and equipments, (12) Surveillance Video communication of surveillance cameras, and so on. However, the Machine Application types are not required to be limited only to the above-mentioned types. And, therefore, other variety of machine application types may also be applied herein.

As another characteristic of the M2M device, the M2M device has the characteristic of low mobility or the characteristic of scarcely once the corresponding M2M device is installed. More specifically, this signifies that the M2M device is stationary for a considerably long period of time. An M2M communication system may simplify or maximize mobility-related (or mobility-associated) operations for a specific M2M application having a fixed position, such as secured access surveillance, public safety, payment, remote maintenance and control, metering, and so on.

As described above, with the increase in the device application type, the number of M2M communication devices may drastically increase as compared to the number of general mobile communication devices. Therefore, when each of the above-described M2M communication devices individually performs communication with the base station, a critical load may occur in a wireless interface (or radio interface) and/or a network.

Hereinafter, the exemplary embodiment of the present invention will be described in detail based upon an exemplary case where the M2M communication is applied to a wireless communication system (e.g., P802.16e, P802.16m, P802.16.1b, P802.16p, and so on). However, the present invention will not be limited only to the examples given herein. And, therefore, the present invention may also be applied to other communication systems, such as 3GPP LTE/LTE-A systems.

FIG. 1 illustrates a general view showing the configuration of devices, such as an M2M device, a base station, and so on, according to an exemplary embodiment of the present invention.

Referring to FIG. 1, an M2M device (100) and a base station (150) may each include a radio frequency (RF) unit (110, 160), a processor (120, 170), and may selectively (or optionally) include a memory (130, 180). The example shown in FIG. 1 illustrates the structures of 1 M2M device and 1 base station. However, an M2M communication environment between multiple M2M devices and the base station may also be established.

Each RF unit (110, 160) may respectively include a transmitter (111, 161), and a receiver (112, 162). The transmitter (111) and the receiver (112) of the M2M device (100) may be configured to transmit and receive signals to and from the base station (150) and other M2M devices. And, the processor (120) may be functionally connected to the transmitter (111) and the receiver (112), so as to be capable of controlling the process performed by the transmitter (111) and the receiver (112) for transmitting and receiving signals to and from other devices. Additionally, the processor (120) may first perform diverse processes on the signal that is to be transmitted and, then, transmit the processed signal to the transmitter, and the processor (120) may also perform processes on the signal that is received by the receiver (112).

When required, the processor (120) may store information included in an exchanged message in the memory (130). And, by being configured of the above-described structure, the M2M device (100) may perform the method according to diverse exemplary embodiments of the present invention, which will hereinafter be described in detail.

Meanwhile, although it is not shown in FIG. 1, the M2M device (100) may include diverse additional configurations depending upon the respective device application type. For example, when the corresponding M2M device (100) is designated to perform smart metering, the corresponding M2M device (100) may include an additional configuration for performing power measurement. And, such power measuring operation may be controlled by the processor (120) shown in FIG. 1, and such power measuring operation may also be controlled by a separately configured processor (not shown).

Although FIG. 1 shows an example of a case when communication is performed between the M2M device (100) and the base station (150), the M2M communication method according to the present invention may also be performed between one or more M2M devices. And, being configured to have the same device configuration as the example shown in FIG. 1, each device may perform the method according to diverse exemplary embodiments of the present invention, which will hereinafter be described in detail.

The transmitter (161) and the receiver (162) of the base station (150) may be configured to transmit and receive signals to and from another base station, M2M server, and M2M devices. And, the processor (170) may be functionally connected to the transmitter (161) and the receiver (162), so as to be capable of controlling the process performed by the transmitter (161) and the receiver (162) for transmitting and receiving signals to and from other devices. Additionally, the processor (170) may first perform diverse processes on the signal that is to be transmitted and, then, transmit the processed signal to the transmitter, and the processor (170) may also perform processes on the signal that is received by the receiver (162). When required, the processor (170) may store information included in an exchanged message in the memory (130). And, by being configured of the above-described structure, the base station (150) may perform the method according to diverse exemplary embodiments of the present invention, which will hereinafter be described in detail.

The processor (120, 170) of each of the M2M device (110) and the base station (150) may direct the operations (e.g., control, adjustment, management, and so on) of each of the M2M device (110) and the base station (150). Each of the processors (120, 170) may be connected to the respective memory (130, 180) storing program codes and data. Each memory (130, 180) may be connected to the respective processor (120, 170), so as to store operating systems, applications, and general files.

The processor (120, 170) of the present invention may also be referred to as a controller, a microcontroller, a microprocessor, a microcomputer, and so on. Meanwhile, the processor (120, 170) may be implemented in the form of hardware or firmware, or software, or in a combination of hardware or firmware, and software. In case of implementing the embodiments of the present invention in the form of hardware, the processor (120, 170) may be equipped with ASICs (application specific integrated circuits) or DSPs (digital signal processors), DSPDs (digital signal processing devices), PLDs (programmable logic devices), FPGAs (field programmable gate arrays), and so on, which are configured to perform the present invention.

Meanwhile, in case of implementing the embodiments of the present invention in the form of firmware or software, the firmware or software may be configured to include a module, procedure, or function, which performs the above-described functions or operations of the present invention. And, the firmware or software, which is configured to perform the present invention may be provided in the processor (120, 170) or may be stored in the memory (130, 180), so as to be operated by the processor (120, 170).

2. Idle Mode

Hereinafter, an idle mode of an M2M environment in which the exemplary embodiments of the present invention are to be performed will be described in detail.

An idle mode refers to an operation mode operating a Paging Group, a Paging Cycle, and a Paging Offset for Power saving, when an M2M device (i.e., user equipment) does not receive any traffic from the base station for a predetermined period of time.

For example, a user equipment, which has shifted to the idle mode, may receive a broadcast message (e.g., paging message), which is broadcasted by the base station, only during an available interval for paging (or interval available for paging) during a paging cycle, so as to be capable of determining whether the corresponding user equipment should shift to a normal mode or whether the corresponding user equipment should maintain the idle mode.

Additionally, the idle mode corresponds to a mechanism allowing the user equipment to periodically receive a downlink message without being registered to a specific base station (i.e., without having to perform any procedure such as a handover process), even when the user equipment wanders around a vast range within a wireless (or radio) link environment including multiple base stations.

For simplicity in the description of the present invention, the idle mode will be described based upon IEEE 802.16e, 16m, and 16p systems. However, the technical spirit and scope of the present invention will not be limited only to the systems presented herein as the standard systems. In order to initiate a shift to the idle mode, the user equipment transmits a DREG-REQ (Deregistration Request) message to the base station, in order to request for a deregistration process from the corresponding base station. Thereafter, as a response to the DREG-REQ message, the base station transmits a DREG-RSP (Deregistration Response) message to the corresponding user equipment. At this point, the DREG-RSP message includes Paging Information. Herein, the initiation of the user equipment for shifting to the idle mode may be disclosed upon request from the base station in an unsoliciated manner. In this case, the base station transmits the DREG-RSP message to the user equipment.

The Paging Information may include values for a Paging Cycle, a Paging Offset, a PGID (Paging Group IDentifier), and a Paging Listening Interval.

After receiving the DREG-RSP message from the base station, the user equipment refers to the paging information, so as to initiate its shift to the idle mode. The idle mode may include a Paging Cycle, and one paging cycle of the idle mode may be configured of a Paging Listening Interval and an Unavailable Interval. At this point, the Paging Listening Interval may be used as the same concept of an Available Interval or a paging interval.

A paging offset indicates a starting point (e.g., frame or subframe) at which the paging listening interval begins within the paging cycle. Also, a paging group identifier indicates an identifier of a paging group, which is allocated to the user equipment. Moreover, the paging information may include paging message offset information. Herein, the paging message offset information indicates a point at which the paging message is being transmitted from the base station.

Thereafter, the user equipment may use the paging information so as to receive a paging message, which is being transmitted to the corresponding user equipment during the paging listening interval. Herein, the paging message may be transmitted through the base station or a paging controller. More specifically, the user equipment may monitor a radio channel (or wireless channel) in accordance with the paging cycle in order to receive the paging message.

Figure 2:
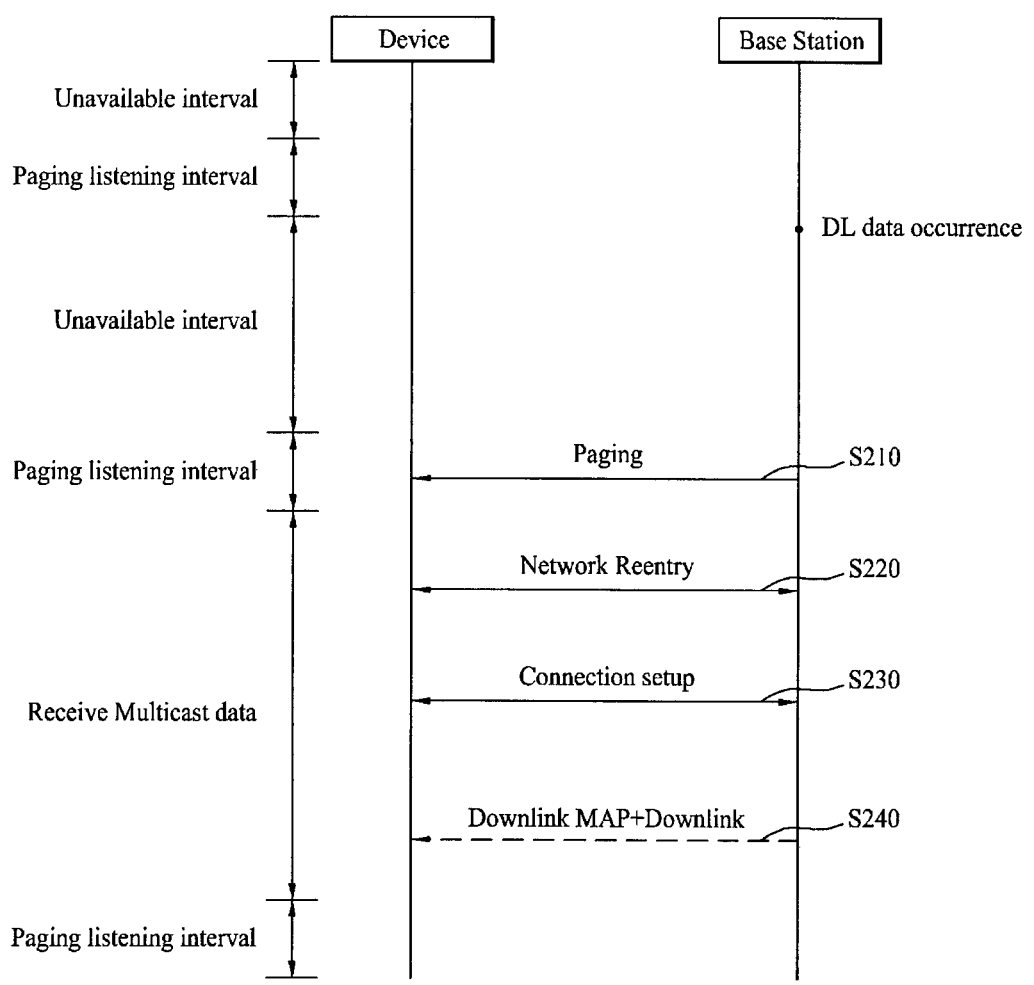
FIG. 2 illustrates a flow chart showing one of many paging methods being performing in an idle mode, which may be applied to the present invention.

FIG. 2 illustrates a flow chart showing one of many paging methods being performing in an idle mode, which may be applied to the present invention.

When data occur (or are generated) in a user equipment, which is being operated in an idle mode, within a paging group to which a base station belongs, the corresponding base station may transmit a paging message to the corresponding user equipment, in order to notify the user equipment of the generated data. Then, the user equipment may receive the transmitted paging message during its paging listening interval, so as to verify the presence or absence of downlink (DL) data that are being delivered to the corresponding user equipment (S210).

If it is determined that downlink data exist (i.e., positive indication), the user equipment performs a ranging process including a network reentry process (S220). Thereafter, the user equipment performs a Connection Setup process, which determines (or sets-up) a connection to a downlink service flow, which is related to the base station, through a DSA (Dynamic Service Addition) process (S230).

After the connection to a service flow is determined (or set-up), the base station transmits downlink control information and downlink data respective to the corresponding service to the user equipment (S240).

In an M2M scenario, since most of the M2M devices do not correspond to a terminal that can be carried (or handheld) by a user, such as a general user equipment, e.g., mobile phones, an automatic application or firmware update process for the M2M devices may correspond to a main application within the M2M service scenario.

For example, in order to update the firmware of each device, an M2M server may transmit updated information to the M2M devices having the corresponding application. In order to transmit such multicast data, which are required to be commonly transmitted to M2M devices that are being operated in the idle mode, the base station shall page the corresponding M2M devices through the paging process, which is described above with reference to FIG. 2.

The user equipments that have been paged (or that have received the paging message) may initiate transmission of a random access code, so as to perform a network reentry process. Accordingly, by accessing (or being connected to) a network, the corresponding user equipments may receive DL traffic transmitted from the base station. However, such processes may increase an unnecessarily excessive usage of the network. Furthermore, in an environment where the M2M devices co-exist with the general user equipments, by having each of the M2M devices and the general user equipment receive unnecessary data, the power consumption level of each user equipment (or terminal) may be increased.

3. M2M Group Identifier (MGID)

An M2M Group Zone corresponds to a logical zone region including multiple ABSs. An M2M Group zone is identified by an M2M GROUP ID. The M2M group ID may be broadcasted through an AAI-SCD message. An MGID (M2M Group Identifier) is assigned with a unique 12-bit value identifying a downlink multicast service flow, which is shared by a group of M2M devices within an M2M group zone.

The M2M device implicitly draws out a zone index corresponding to an M2M Group Identifier based upon an order of M2M group identifiers within a broadcast message (e.g., AAI-SCD message). A first zone index included in the M2M group identifier is assigned with a value 0, and, when the maximum value of the M2M group zone being supported by the base station is defined as 4, the zone index continuously increases to up to MAX_M2M_GROUP_ZONE-1.

In case the ABS corresponds to only a portion of an M2M group zone, the base station broadcasts a single M2M GROUP ZONE_ID, and the M2M devices draw out the corresponding M2M group zone index (0b00). The M2M device group may be found by using the MGID and the respective M2M group zone index. All MGIDs are assigned to the M2M devices belonging to the same M2M group zone. The MGID is assigned to a multicast service flow of the M2M devices through a DSA process after an initial network entry process. Also, the MGID may explicitly exit the network or may be deactivated when the M2M devices enter the DCR mode. The assigned MGID may be maintained even when the M2M devices are being operated in, the idle mode. However, when the M2M devices exit the corresponding network, or when the M2M devices explicitly delete the service flow related to the assigned MGID, the assigned MGID may be deactivated.

The M2M device may be assigned with multiple MGIDs respective to various multicast service flows each different from one another. The MGID may be re-assigned in the connected state and/or in the Idle mode state. In the connected state, the MGID may be modified or deleted through the DSC process and the DSD process. In the Idle Mode state, the MGID may be modified through a Location Update (LU) or a network re-entry process.

When the base station seeks to modify the MGID respective to all M2M devices within the multicast group, the base station may trigger a group location update through a paging message. When the M2M device performs a timer-based location update, in case the base station requires an MGID respective to the corresponding M2M device to be updated, the base station may transmit a ranging response (AAI-RNG-RSP) message including a new MGID as a response to a ranging request (AAI-RNG-REQ) message during the location update process.

The base station may transmit a paging message (e.g., AAI-PAG-ADV) for updating the MGID and for indicating a new value for all M2M devices within the group. When the M2M devices belonging to the M2M group, which is identified by the MGID, and being operated in the Idle mode receive a paging message including the corresponding MGID and an Action Code, which is set to 0b11, the corresponding M2M device should update the MGID based upon a new MGID value, which is being indicated.

4. Flow Identifier (FID)

The connection of each advanced mobile station (AMS) is assigned with a 4-bit FID for uniquely identifying a corresponding connection. The FID identifies a Control Connection and a Unicast Transport Connection. The FID for an E-MBS connection is used for identifying a specific E-MBS flow within a region of the E-MBS zone along with an E-MBS ID, which corresponds to a unique identifier configured of 12 bits. The FID for a Multicast connection is used with a 12-bit Multicast Group ID for uniquely identifying a specific multicast flow within an ABS zone. A Downlink and Uplink transport FID (DL and UL Transport FID) is assigned from a transmission FID space, which is defined in Table 1 shown below.

TABLE 1

| Value | Content |
|---|---|
| 0000 | Control FID for unencrypted control connection payload in the MAC PDU(unicast control FID when PDU is allocated by unicast assignment A-MAP IE; broadcast control FID when PDU is allocated by broadcast assignment A-MAP IE) |

TABLE 1-continued

| Value | Content |
|---|---|
| 0001 | Unicast Control FID for encrypted control connection payload in the MAC PDU |
| 0010 | FID for Signaling header |
| 0011 | FID for transport connection associated with default service flow (UL and DL) |
| 0100-1111 | FID for transport connection |

An FID, which is assigned to a specific DL transmission connection, is not assigned to another DL transmission connection, which belongs to the same AMS. Similarly, the FID being assigned to a specific UL transmission connection is not assigned to another UL transmission connection, which belongs to the same AMS. The FID that is used for the DL transmission connection may be assigned to another UL transmission connection belonging to the same AMS, and the FID that is used for the UL transmission connection may be assigned to another DL transmission connection belonging to the same AMS.

A specific FID may be assigned previously. For example, among the FID values, '0000' and '0001' of Table 1 may be used for indicating a control FID. Also, '0010' and '0011' may each be used for indicating an FID respective to a signaling header and a basic service flow. Any connection within the ABS may be identified by a combination of the FID and STID (Station Identifier) shown in Table 1.

5. Medium Access Control (MAC) Control Message

Hereinafter, the control messages that are used in the exemplary embodiments of the present invention will be described in detail.

(1) Broadcast Assignment A-MAP Information Element

A BA A-MAP IE (Broadcast Assignment A-MAP Information Element) is being transmitted for assigning (or allocating) a resource for a broadcast burst, a multicast burst, or an NS-RCH. Herein, a broadcast burst may include one or more broadcast MAC control messages. Table 2 shown below indicates one of many BA A-MAP IE structures that can be used in the exemplary embodiments of the present invention.

TABLE 2

| Statement | Size (bits) | Description |
|---|---|---|
| Broadcast_Assignment_A-MAP_IE( ){ | | |
| A-MAP IE Type | 4 | Broadcast Assignment A-MAP IE |
| Function index | 2 | 0b00: This IE carries broadcast assignment information<br>0b01: This IE carries handover ranging channel allocation information<br>0b10: This IE carries multicast assignment information<br>0b11: Reserved |
| If(Function index ==0b00){ | | |
| Burst Size | 6 | Burst size as indicated in the first 39 entries in Table 303 |
| Resource Index | 11 | 512 FFT size: 0 in first 2 MSB bits + 9 bits for resource index<br>1024 FFT size: 11 bits for resource index<br>2048 FFT size: 11 bits for resource index<br>Resource index includes location and allocation size. |
| Long TTI Indicator | 1 | Indicates number of AAI subframes spanned by the allocated resource.<br>0b0: 1 AAI subframe (default TTI)<br>0b1: 4 DL AAI subframe for FDD or all DL AAI subframes for TDD (long TTI) |

TABLE 2-continued

| Statement | Size (bits) | Description |
|---|---|---|
| Transmission Format | 1 | 0b0: on time domain repetition<br>0b1: with time domain repetition |
| If(Transmission format ==0b1){ | | |
| Repetition | 2 | 0b00: no more repetition of the same burst<br>0b01: the same burst shall be transmitted one more time.<br>0b10: the same burst shall be transmitted two more times.<br>0b11: the same burst shall be transmitted three more time. |
| Reserved<br>}else{ | 13 | reserved bits |
| Reserved<br>}<br>}else if(Function Index == 0b01){ | 15 | reserved bits |
| Number of Ranging Opportunities (N)<br>for(i=0; i<N; i++){ | | 0: one NS-RCH<br>1: two NS-RCHs |
| Subframe Index | 1 | |
| Ranging opportunity index | | Indicates 2-bit Opportunity index of the ranging channel specified in 6.2.15.3<br>0b0: 0b01<br>0b0: 0b10 |
| }<br>Reserved<br>}else if (Function Index==0b01){ | 29/25 | |
| Multicast Group ID | 12 | ID of a group that receives multicast assignment |
| Burst Size | 6 | burst size as indicated in the first 39 entries in Table 307 |
| Resource Index | 11 | 512 FFT size: 0 in first 2 MSB bits + 9 bits for resource index<br>1024 FFT size: 11 bits for resource index<br>2048 FFT size: 11 bits for resource index<br>Resource index includes location and allocation size. |
| Long TTI indicator | 1 | Indicates number of AAI subframes spanned by the allocated resource.<br>0b0: 1 AAI subframe (default TTI)<br>0b1: 4 DL AAI subframe for FDD or all DL AAI subframes for TDD (long TTI) |
| Reserved<br>} | 4 | reserved bits |

The detailed operations of the fields included in the BA A-MAP IE are described in Table 2. In Table 2, when a Function Index indicates 0b00, this indicates that the corresponding BA A-MAP IE includes broadcast assignment information. And, when the Function Index is set to 0b10, this indicates that the corresponding BA A-MAP IE includes multicast assignment information.

More specifically, depending upon the set-up value of the function index, the BA A-MAP IE may further include resource assignment (or allocation) information for the corresponding broadcast transmission and/or multicast transmission (e.g., one or more of a Burst size field, a Resource Index (Resource Index) field, a Long TTI Indicator field, a Transmission format field, and a Multicast Group ID field).

A 16-bit CRC being applied to the BA A-MAP IE shown in Table 1 is generated in accordance with the contents included in the BA A-MAP IE. The CRC is masked to the BA A-MAP IE as a 16-bit CRC, which is generated in accordance with Table 3 shown below.

TABLE 3

| Masking Prefix | Remaining 15 bit LSBs | |
|---|---|---|
| (1 bit MSB) | Type Indicator | Masking Code |
| 0b0 | 0b000 | 12 bit STID or TSTID |
| | 0b001 | Refer to Table 193 |
| | 0b010 | Refer to Table 194 |
| 0b1 | 15-bit RA-ID: The RA-ID is derived from the AMS's random access attributes [i.e., superframe number (LSB 5 bits), frame_index (2 bits), preamble code index, for ranging or BR (6 bits) and opportunity index for ranging or BR (2 bits)] as defined below:<br>RA-ID = (LSB 5 bits of superframe number | frame_index | preamble_code_index | opportunity_index) | |

Referring to Table 3, among the 16 bits of the CRC, 1 most significant bit (MSB) is used as the Masking Prefix, and a Message Type Indicator uses 3 bits, and a Masking Code uses 12 bits in accordance with the Type Indicator. For example, when the Type Indicator is set to 0b000, the Masking Code uses a 12-bit STID (Station Identifier) or TSTID (Temporary STID). Furthermore, when the Type Indicator is set to 0b001, the Masking Code uses the value indicated in Table 4 shown below.

Table 4 indicates another example of a Masking Code for M2M broadcasting, when the Masking Prefix of Table 3 is set to 0b0, and when the Type Indicator is set to 0b001.

TABLE 4

| Decimal value | Description |
|---|---|
| 0 | Used to mask Broadcast Assignment A-MAP IE for broadcast or ranging channel assignment |
| 1 | Used to mask BR-ACK A-MAP IE |
| 2-128 | Used to mask Group Resource Allocation A-MAP IE (group ID) |
| Others | Reserved |

Referring to Table 4, the masking codes that are being used in accordance with each assignment A-MAP IE are marked in decimal values.

Referring back to Table 2 and Table 3, when the function index of the BA A-MAP IE is set up to 0b00 or 0b01, a 16-bit CRC having a Masking Prefix set to 0b0 and a message Type indicator set to 0b001 is masked to the BA A-MAP IE. If the function index is set to 0b10, a 16-bit CRC having the masking prefix of Table 3 set to 0b0 and a message Type indicator set to 0b010 is masked to the BAA-MAP IE.

In Table 2, an MGID (Multicast Group ID) corresponds to an identifier of a group receiving a multicast burst, and the identifier is assigned with a unique value within the base station (or ABS). Herein, the MGID may be assigned through a DSA process (DSA-REQ/RSP message) and may be changed through a DSC process (DSC-REQ/RSP message).

Broadcast and multicast bursts that are being transmitted in accordance with the BA A-MAP IE may be transmitted by using an SFBC as a MIMO encoder format and a QPSK as a modulation scheme. However, a traffic indication message (AAI-TRF-IND), a paging message (AAI-PAG-ADV), and a paging information message (PG_Info) are not transmitted via time domain repetition. Other broadcast MAC control messages may be transmitted via time domain repetition. Herein, one repetition period of the time domain repetition corresponds to 1 frame.

During the repetition period according to which the broadcast burst is being repeatedly transmitted, other broadcast bursts may be transmitted only without the time domain repetition. When transmitting each broadcast burst via time domain repetition, the ABS transmits a BA A-MAP IE, in which a value of the number of remaining repetition times decreases by 1 after each transmission. More specifically, when the ABS performs a first transmission in a $k^{th}$ frame, when the value of the number of remaining repetition times is equal to N−1, the transmission process is completed in the k+N−1$^{th}$ frame. Furthermore, the value of the repetition field decreases by 1 after each transmission.

Among other fields of the BA A-MAP IE, only a resource index field is varied during the repetition period according to which the time domain repetition is performed. When transmitting the broadcast burst, the SPID is always set to 0. And, when each of the Long TTI indicator field and the transmission format field is set to 1, the broadcast burst is not assigned in a frame where an SFH (Super Frame Header) is being transmitted.

(2) M2M Multicast Assignment A-MAP IE

In order to transmit M2M multicast data to the M2M devices, information respective to the resource region assigned for the M2M multicast data may be notified in advance to the M2M devices. Therefore, an M2M MA A-MAP IE (M2M Multicast Assignment A-MAP IE) including resource assignment information may be transmitted to the M2M devices. According to the exemplary embodiments of the present invention, the M2M MA A-MAP IE may be referred to as an M2M Group Assignment A-MAP IE.

Table 5 shown below shows an exemplary M2M MA A-MAP IE message format used in the exemplary embodiments of the present invention.

TABLE 5

| Statement | Size | Content |
|---|---|---|
| M2M_MA_A-MAP_IE( ){ | | |
| A-MAP IE Type | 4 | M2M Group Assignment A-MAP IE |
| Burst Size | 6 | |
| Resource Index | 11 | |
| Long TTI Indicator | 1 | |
| M2M Group Zone Index | 2 | M2M Group Zone Index of the corresponding M2M Group Zone ID that the MGID belongs to. It is derived based on the implicit ordering of the M2M GROUP ZONE IDs in the AAI-SCD message transmitted by the ABS. |
| Reserved | 16 | |
| } | | |

Referring to Table 5, an M2M MA A-MAP IE message may include an A-MAP IE type field indicating that the corresponding IE is an M2M MA A-MAP IE, and an M2M group zone index corresponding to resource assignment information for an assignment region to which multicast data are transmitted and corresponding to an M2M group zone identifier to which the MGID belongs. At this point, the resource assignment information may include a burst size field indicating the size of a corresponding allocated location, a resource index field, and a Long TTI indicator field. At this point, a 16-bit CRC being masked to the M2M MA A-MAP IE may include a masking prefix set to 0b0, a type indicator set to 0b010, and a 12-bit MGID.

(3) M2M Device Group MAC Control (AAI-MGMC) Message

Hereinafter, an AAI-MGMC (M2M device Group MAC Control) message, which may be used in the exemplary embodiment of the present invention will be described in detail.

The AAI-MGMC message is being transmitted to a group of user equipments (i.e., M2M devices), each belonging to the same M2M device group (defined by the MGID), for the parameters and/or for indication. The ABS may transmit an AAI-MGMC message to the user equipments, which are in a connection state other than the idle mode, by using a broadcast method or a multicast method.

Table 6 shown below shows a list of exemplary MAC control messages

TABLE 6

| No. | Function Region | Name of Message | Message Description | Security | Connection |
|---|---|---|---|---|---|
| 70 | RELAY | AAI-ARS-CONFIG-CMD | ARS Configuration Command | N/A | Unicast |

TABLE 6-continued

| No. | Function Region | Name of Message | Message Description | Security | Connection |
|---|---|---|---|---|---|
| 72 | M2M | AAI-MGMC | M2M Device group MAC control | N/A | Broadcast |
| 73-255 | | | Reserved | | |

Table 7 shown below shows an AAI-MGMC message format.

TABLE 7

| Field | size (bits) | Description | Condition |
|---|---|---|---|
| Action Code | | Used for identifying the purpose of the corresponding message 0b00: MGID reassignment value 0b01-0b11: reserved | |
| If(Action Code==0x00){ for(i=1;i<=Num_MGID;i++){ | | Number of MGIDs that are to be updated | Exists when the MGID is required to be updated |
| Current MGID | 2 | Current MGID value | |
| New MGID | 2 | New MGID value that is to be allocated | |
| M2M Group Zone Index | | M2M_Group_Zone_Index corresponding to an M2M_GROUP_ZONE_ID, to which the MGID belongs | |
| } } | | | |

The base station uses an AAI-MGMC message including an MGID in order to transmit information respective to multiple user equipments (M2M devices). When the AAI-MGMC message is transmitted by using the broadcast manner, a physical layer (PHY) layer burst accompanying the AAI-MGMC message is transmitted in accordance with the BA A-MAP IE.

If the AAI-MGMC message is accompanied by control information respective to a single M2M device group, and if a multicast SA (Security Association) is set-up for the corresponding M2M device group, the AAI-MGMC message may be encrypted by using the corresponding multicast SA.

If the AAI-MGMC message is transmitted in a multicast method, a PHY burst including a MAC PDU (Medium Access Control Protocol Data Unit), which accompanies the AAI-MGMC message respective to a single M2M device group, may be indicated by an M2M group assignment A-MAP IE. And, an FID of the MAC PDU, which accompanies an AAI-MGMC message that is either encrypted or not encrypted, may respectively set to 0 or 1. The user equipment transmits an AAI-MSG-ACK message to the base station as a response to the AAI-MGMC message.

(4) Multicast Transmission End Indication (AAI-MTE-IND) Message

Hereinafter, an AAI-MTE-IND (Multicast Transmission End Indication) message that may be used by the exemplary embodiments of the present invention will be described in detail.

While the base station transmits a multicast message to a user equipment in an idle mode, the base station may use the MGID to transmit the AAI-MTE-IND message to the user equipment by using the broadcast manner or the multicast manner when there is no multicast message that is to be transmitted to the user equipment (M2M device). When the user equipment operating in the idle mode receives the AAI-MTE-IND message, the corresponding user equipment re-enters a paging unavailable interval.

Table 8 shown below shows an exemplary AAI-MTE-IND message format that is used in the exemplary embodiments of the present invention.

TABLE 8

| Field | Size (bits) | Value/Contents | Condition |
|---|---|---|---|
| MGID | 12 | MGID related to multicast traffic | |
| M2M Group Zone Index | 2 | M2M Group Zone Index corresponding to an M2M Group Zone Identifier to which the MGID belongs | |

Referring to Table 8, the AAI-MTE-IND message includes an MGID field, which indicates the corresponding multicast traffic, and an M2M Group Zone Index, which corresponds to an M2M Group Zone Identifier to which the MGID belongs. When the AAI-MTE-IND message is being transmitted by using the broadcast manner, a physical layer (PHY) burst accompanying the AAI-MTE-IND message may be transmitted in accordance with the BA a-MAP IE.

If the AAI-MTE-IND message is accompanied by control information respective to a single M2M device group, and if a multicast SA (Security Association) is set-up for the corresponding M2M device group, the AAI-MTE-IND message may be encrypted by using the corresponding multicast SA.

If the AAI-MTE-IND message is transmitted in a multicast method, a MAC PDU (Medium Access Control Protocol Data Unit), which accompanies the AAI-MGMC message for a single M2M device group, may be indicated by an M2M group assignment A-MAP IE. And, an FID of the MAC PDU, which accompanies an AAI-MTE-IND message that is either encrypted or not encrypted, may respectively set to 0 or 1. When the user equipment operating in the idle mode receives the AAI-MTE-IND message, the corresponding user equipment re-enters a paging unavailable interval.

6. Multicast Operations Respective to an M2M Device

(1) Multicast Operations in General

A multicast service for an M2M device provided by a base station (ABS) supports simultaneous (or synchronous) transmission of DL data to M2M devices belonging to the same M2M device group by using an MGID. A multicast service is associated with the ABS is provided only in a downlink. Each multicast connection is provided along with a QoS for the corresponding service flow and traffic parameters. Service flows accompanying multicast data are initiated by individual M2M devices participating in the corresponding service in connected state. At this point, the M2M devices acquire parameters identifying a service flow related to the corresponding service.

The same MGID is assigned to a group of M2M devices participating in the same multicast service, and the corresponding MGID is assigned during a DSA process. In order to access a multicast service, M2M devices that are assigned with the MGID may apply a 16-bit CRC mask, which includes a masking prefix being set to 0b0, a message type indicator being set to 0b010, and a 12-bit MGID as the masking code, in order to decode the M2M Broadcast Group Assignment A-MAP IE. The M2M devices acquire resource assignment information for a multicast burst through the M2M multicasting assignment A-MAP IE (M2M MA A-MAP IE). At this point, an FID field of a MAC header of a MAC PDU (being included in the multicast burst), which accompanies a MAC SDU respective to a multicast service flow, is set to '0100'. The MAC PDU corresponds to a transmission unit that is used in a MAC layer, and, when transmitted from the physical layer (PHY), the MAC PDU is transmitted in a multicast burst manner.

By configuring a multicast connection among each of the M2M devices, the base station may set up a DL multicast service, which is associated with the corresponding service. In the exemplary embodiments of the present invention, any kind of FID may be used for the multicast service. More specifically, a dedicated FID for a multicast transmission connection may not be set up. Since the multicast connection is associated to a service flow, the multicast connection may be associated with the QoS and traffic parameters of the service flow. In relation with the multicast connection, although an ARQ (Automatic Retransmission reQuest) is not applied, an encryption key is used in order to ensure integrity protection and encryption respective to the corresponding multicast traffic.

(2) M2M Multicast Operation in an Idle Mode

The M2M base station may provide a multicast service to an M2M terminal (or device) operating in the Idle Mode, with or without a request for network re-entry. Before the base station transmits downlink (DL) multicast data, the base station may transmit a paging message, which include a multicast traffic indication, to the M2M terminal during the paging listening interval. If the M2M device receives the paging message, which indicates the M2M device to receive the multicast traffic without network re-entry, and if the corresponding paging message does not include information on a Multicast Transmission Start Time, the corresponding M2M device may start receiving the DL multicast data without ending (or deactivating) the Idle Mode.

The Multicast Transmission Start Time included in the paging message indicates a time point at which the DL multicast data, which are designated to be transmitted by the base station, are to be transmitted. The Multicast Transmission Start Time value shall be smaller than a start time value of a next paging listening interval of the M2M device, which has received the paging message (e.g., AAI-PAG-ADV). The M2M device may turn its power off until a specific frame indicated by the Multicast Transmission Start Time, which is included in the paging message. And, once the multicast data transmission is ended, the base station transmits the AAI-MTE-IND message to the corresponding M2M device. The M2M device may enter a paging unavailable interval as soon as the M2M device receives the AAI-MTE-IND message.

7. Method for Multicasting M2M Broadcast MAC Control Message

As described above, in an M2M multicast service, an AAI-MTE-IND message is defined as a message, which is being transmitted in order to notify the end (or completion) of a multicast traffic. And, an AAI-MGMC message is defined in order to simultaneously update an M2MCID for all user equipments belonging to the same group. As MAC control messages, the AAI-MTE-IND message and AAI-MGMC messages may be transmitted from the base station by using the broadcast manner or the multicast manner.

And, in a CRC of a conventional BA A-MAP IE, which includes information on a transmission zone respective to the MAC control message, may include a masking prefix, which is set to '0', and a type indicator, which is set to '0b001'. And, the CRC of the conventional BA A-MAP IE may be masked by a 16-bit CRC, which includes a masking code set to '0'. At this point, a function index of the BA A-MAP IE has been set to '0b00'.

More specifically, the messages that are conventionally transmitted were not differentiated as messages corresponding to M2M devices and general user equipments, but were only differentiated as messages being transmitted via multicast transmission or broadcast transmission.

As described above, when the AAI-MTE-IND message or the AAI-MGMC message is transmitted via broadcast transmission, not only the M2M devices but also the general user equipments (AMSs, UEs and MS/SSs) decode the broadcast messages designated for the M2M communication. This may least to an unnecessary (or excessive) increase in a broadcast burst decoding overhead.

Additionally, since each of the MAC control messages which are transmitted with respect to the M2M devices, is transmitted in a broadcast manner, even if each of the corresponding devices corresponds to an M2M device, and even when the MAC control message (e.g., AAI-MTE-IND, AAI-MGMC) does not correspond to a message for the M2M group, to which the corresponding M2M device belongs, a process of decoding a burst for the AAI-MTE-IND message, verifying the MGID included in the MAC control message, and verifying whether or not the verified MGID belongs to the M2M group, to which the corresponding M2M device belongs, should be performed.

In this case, when the corresponding messages include only the information for only one M2M group, at a time point when the base station is scheduled to transmit the MAC control message, another M2M device that does not belong to the corresponding group and other general user equipments is required to perform an unnecessary process of having to receive an unnecessary MAC control message.

Moreover, in order to transmit the MAC control message, when a fixed FID (e.g., 0b0100), which was used earlier for transmitting the conventional multicast data (i.e., multicast burst) to the M2M MA A-MAP IE, is used, a general user equipment is incapable of determining whether the corresponding MAC PDU (Medium Access Control Protocol Data Unit) corresponds to multicast data or to an M2M specific MAC control message. Accordingly, a malfunction (or misoperation) may occur in the performance of the general user equipment during the process of processing the M2M specific MAC control message to general multicast data.

Therefore, according to the exemplary embodiments of the present invention, in order to reduce unnecessary burst decoding overhead of general user equipments, and in order to reduce an unnecessary decoding process of the M2M devices, diverse methods for transmitting MAC control messages by using a multicast method will hereinafter be described in detail.

Figure 3:
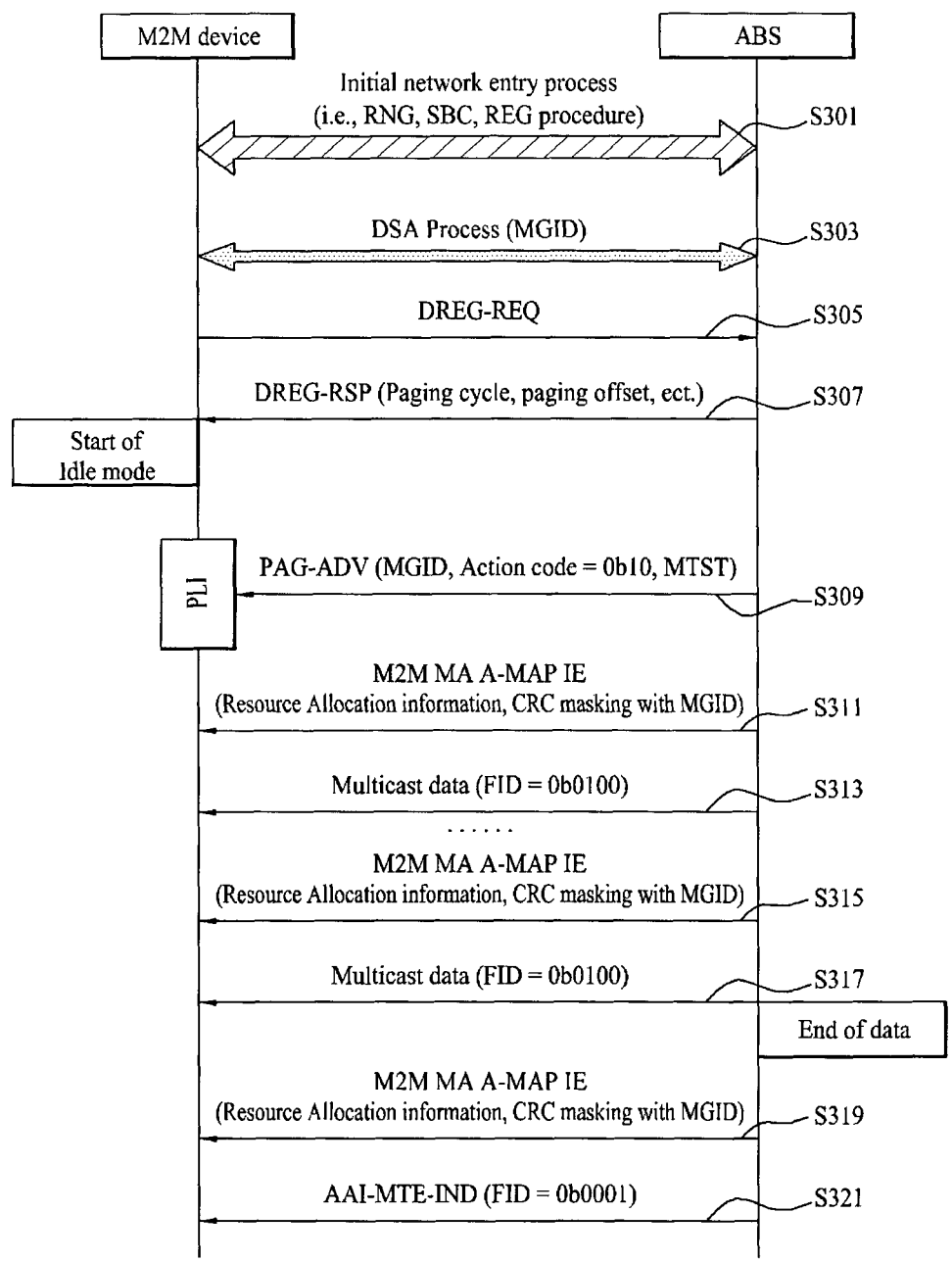
FIG. 3 illustrates one of many methods for transmitting a MAC control message in a multicast format according to an exemplary embodiment of the present invention.

FIG. 3 illustrates one of many methods for transmitting a MAC control message in a multicast format according to an exemplary embodiment of the present invention.

The M2M device may perform an initial network entry process with the base station (ABS). As the initial network entry process, an initial ranging process (AAI-RNG-REQ/RSP), a basic subscriber station capability negotiation process (AAI-SBC-REQ/RSP), and a network registration process (AAI-REG-REQ/RSP) may be performed (S301).

After performing the initial network entry process, the M2M device may perform a process of creating a service flow with the base station, in order to be provided with a specific service. For example, the M2M device may perform a dynamic service addition process (DSA process) with the base station. At this point, when multicast data are required to be transmitted to the M2M device through by performing the DSA process, the base station may assign a multicast group identifier (MGID) (S303).

Subsequently, when the M2M device does not have any data that are to be transmitted to the base station or received from the base station, the M2M device transmits a de-registration request (DREG-REQ) message in order to enter the Idle Mode (S305).

Additionally, the base station may transmit a de-registration response (DREG-RSP) message including paging information, such as a paging cycle period, a paging offset, and so on, to the M2M device as a response to the de-registration request message. Reference may be made to the description of the Idle Mode operation of section 1 and to FIG. 2 for the detailed description of the Idle Mode operation (S307).

After receiving the DREG-RSP message, the M2M device may enter the Idle Mode, and the M2M device may receive a paging message (e.g., AAI-PAG-ADV) message from the base station during the PLI (Paging Listening Interval). At this point, the paging message (e.g., AAI-PAG-ADV) may include a multicast traffic indicator, which indicates a multicast traffic transmission, (e.g., Action code=0b10), information on a M2M group, which is scheduled to receive the multicast traffic (or multicast data), (e.g., M2M Group ID), and information on a start time at which the multicast traffic is transmitted (MTST (Multicast Traffic Start Time)) (S309).

At this point, when the M2M Group ID (MGID) which is received by the M2M device corresponds to an M2M group to which the corresponding M2M device belongs, and when the operation code of the paging message (i.e., multicast traffic indicator) is set to 0b10, the processor (120) of the M2M device may control the corresponding M2M device to be in a stand-by mode, in order to receive the multicast data (traffic) without network re-entry.

Therefore, the M2M device receives an M2M multicast assignment A-MAP information element (M2M MA A-MAP IE), which includes resource assignment information indicating a resource region, to which the multicast data are transmitted, at a time point indicated by the MTST. At this point, the M2M MA A-MAP IE which is CRC-masked with an MGID is transmitted. In this case, the MGID identifies the multicast data that are to be transmitted to the M2M device (S311, S315).

Then, the M2M device may receive multicast data through a resource region which is indicated by the resource assignment information included in the M2M MA A-MAP IE. At this point, a MAC header of the MAC PDU, to which the multicast data are transmitted, may include an FID indicating the transmission of the corresponding multicast data. At this point, the FID may be set to 0b0100 (ref. Table 1) (S313, S317).

After transmitting the last multicast data to the M2M device, it is preferable that the base station indicates a multicast data transmission end to the M2M device. Accordingly, the base station may transmit an AAI-MTE-IND message for indicating a multicast data transmission end (S319).

At this point, the M2M MA A-MAP IE may include resource assignment information indicating a resource region for transmitting the AAI-MTE-IND message (ref. Table 5). Also, the base station may mask a CRC including the MGID to the M2M MA A-MAP IE in order to transmit the M2M MA A-MAP IE only to the M2M devices belong to the M2M group, to which the multicast data (S313, S317) are transmitted.

Table 9 shown below shows an exemplary CRC mask structure being applied to the M2M MA A-MAP IE of the present invention.

TABLE 9

| Masking Prefix | Remaining 15 bit LSBs | |
|---|---|---|
| (1 bit MSB) | Type Indicator | Masking code |
| 0b0 | 0b000 | 12 bit STID or TSTID |
|  | 0b001 | Refer to Table 850 |
|  | 0b010 | Refer to Table 851 |
|  | 0b011 | LSB 12 bits of FMDID or LSB 12 bits of DID |
|  | 0b100 | 12 bit MGID |
| 0b1 | 15-bit RA-ID: The RA-ID is derived from the AMS's random access attributes [i.e., superframe number (LSB 5 bits), frame_index (2 bits), preamble code index for ranging or BR (6 bits) and opportunity index for ranging or BR (2 bits)] as defined below: RA-ID = (LSB 5 bits of superframe number | frame_index | preamble_code_index | opportunity_index) | |

Referring to Table 9, the masking prefix uses 1 most significant bit (MSB) of the 16 bits of the CRC, the message type indicator uses 3 bits, and the masking code uses 12 bits in accordance with the type indicator. For example, when the type indicator is set to 0b000, the masking code may use a 12-bit STID (Station Identifier) or a TSTID (Temporary STID).

However, in the exemplary embodiments of the present invention, a new type indicator '0b100' may be used for the M2M MA A-MAP IE, which is being used for assigning a multicast transmission region. More specifically, when the type indicator of the CRC mask is set to 0b100, the corresponding M2M group identifier (MGID) may be used as the masking code.

Accordingly, referring back to FIG. 3, in step S319, the M2M MA A-MAP IE may be masked to a 16-bit CRC, which includes a masking prefix being set to 0b0, a type indicator being set to 0b100, and a masking code corresponding to an MGID for the multicast data being transmitted in step S313 to step S317.

In FIG. 3, only one M2M device is illustrated. However, this is merely an example given to facilitate the description of the exemplary embodiment of the present invention. Therefore, multiple M2M devices may belong to the base station region (or zone).

Therefore, the M2M device may de-mask the M2M MA A-MAP IE. And, only the M2M device having the MGID, which is masked to the corresponding M2M MA A-MAP IE, may receive and decode the M2M MA A-MAP IE, which is transmitted in step S319.

When the M2M device of FIG. 3 normally (or successfully) receives the M2M MA A-MAP IE, which is transmitted in step S319, the corresponding M2M device may receive the MAC control message (i.e., AAI-MTE-IND), which indicates the multicast data transmission end, through a resource region indicated by the resource assignment information being included in the M2M MA A-MAP IE (S321).

At this point, since the AAI-MTE-IND message, which is transmitted in step S321, corresponds to a MAC control message, a flow identifier (FID) being included in a MAC header (e.g., AGMH) for the corresponding message shall be selected from one of the control FIDs. Table 10 shown below shows an exemplary multicast control FID, which may be used in the present invention.

TABLE 10

| Value | Contents |
| --- | --- |
| 0000 | Control FID for unencrypted control connection payload in the MAC PDU (unicast control FID when PDU is allocated by unicast assignment A-MAP IE; broadcast control FID when PDU is allocated by broadcast assignment A-MAP IE) |
| 0001 | Unicast Control FID for encrypted control connection payload in the MAC PDU, Multicast Control FID for encrypted control connection payload in the MAC PDU (Multicast control FID when PDU is allocated by M2M group assignment A-MAP IE) |
| ... | ... |

Referring to Table 10, a control FID may have an FID value of '0000' and '0001'. At this point, an FID being assigned with the value of '0001' may be used for the multicast data transmission. More specifically, when the FID value is equal to '0000', the FID may be identical to Table 1. However, when the FID value is equal to '0001', the FID may be used on a multicast MAC control message. And, herein, it may be indicated that a control connection payload included in the MAC PDU is encrypted.

Table 11 shown below shows another exemplary multicast control FID, which may be used in the present invention.

TABLE 10

| Value | Contents |
| --- | --- |
| 0000 | Control FID for unencrypted control connection payload in the MAC PDU (unicast control FID when PDU is allocated by unicast assignment A-MAP IE; broadcast control FID when PDU is allocated by broadcast assignment A-MAP IE), Multicast Control FID for unencrypted control connection payload in the MAC PDU (Multicast control FID when PDU is allocated by M2M group assignment A-MAP IE) |
| 0001 | Unicast Control FID for encrypted control connection payload in the MAC PDU, Multicast Control FID for encrypted control connection payload in the MAC PDU (Multicast control FID when PDU is allocated by M2M group assignment A-MAP IE) |
| ... | ... |

The multicast control FID, which is newly defined in Table 11, may indicate that the corresponding MAC PDU is a multicast control message and may also indicate whether or not a payload included in the corresponding MAC PDU is encrypted. Referring to Table 11, a multicast control FID value of '0000' is used to indicate a case when a non-encrypted payload is included in the MAC PDU. And, a multicast control FID value of '0001' is used to indicate a case when an encrypted payload is included in the MAC PDU. More specifically, the multicast control FID being used in Table 11 is used for identifying the MAC control message being transmitted through a resource region, which is assigned by the M2M MA A-MAP IE.

Therefore, in case of general multicast data, the FID may be assigned with a value of 0b0100 (ref. step S313 or step S317), and the FID may be assigned with a value of 0b0000 or 0b0001 with respect to the multicast MAC control message. For example, in step S321, the AAI-MTE-IND, which corresponds to the MAC control message, is included in the MAC PDU so as to be transmitted from the MAC layer. More specifically, the AAI-MTE-IND is included in the payload of the MAC PDU. And, depending upon whether or not the corresponding payload is encrypted, '0000' or '0001' may be used as the FID value shown in Table 11.

Accordingly, when the M2M device receives a MAC PDU through a resource region assigned by the M2M MA A-MAP IE in a multicast manner, when the FID field of the MAC header (i.e., AGMH) within the MAC PDU is set to 0b0001, the M2M device may determine that the corresponding MAC PDU comprises an encrypted MAC control message. Additionally, when the FID field of the MAC header (i.e., AGMH) within the MAC PDU is set to 0b0000, the M2M device may determine that the corresponding MAC PDU comprises a non-encrypted MAC control message. Therefore, by using the FID, the M2M device may determine whether or not the corresponding MAC PDU corresponds to a multicast burst for the M2M device and may also determine whether or not the MAC control message, which is included in the MAC PDU, has been encrypted.

In step 321, when the M2M device receives an AAI-MTE-IND message notifying that the multicast data transmission has ended, the processor (120) of the M2M device may control the M2M device to enter the unavailable interval.

Figure 4:
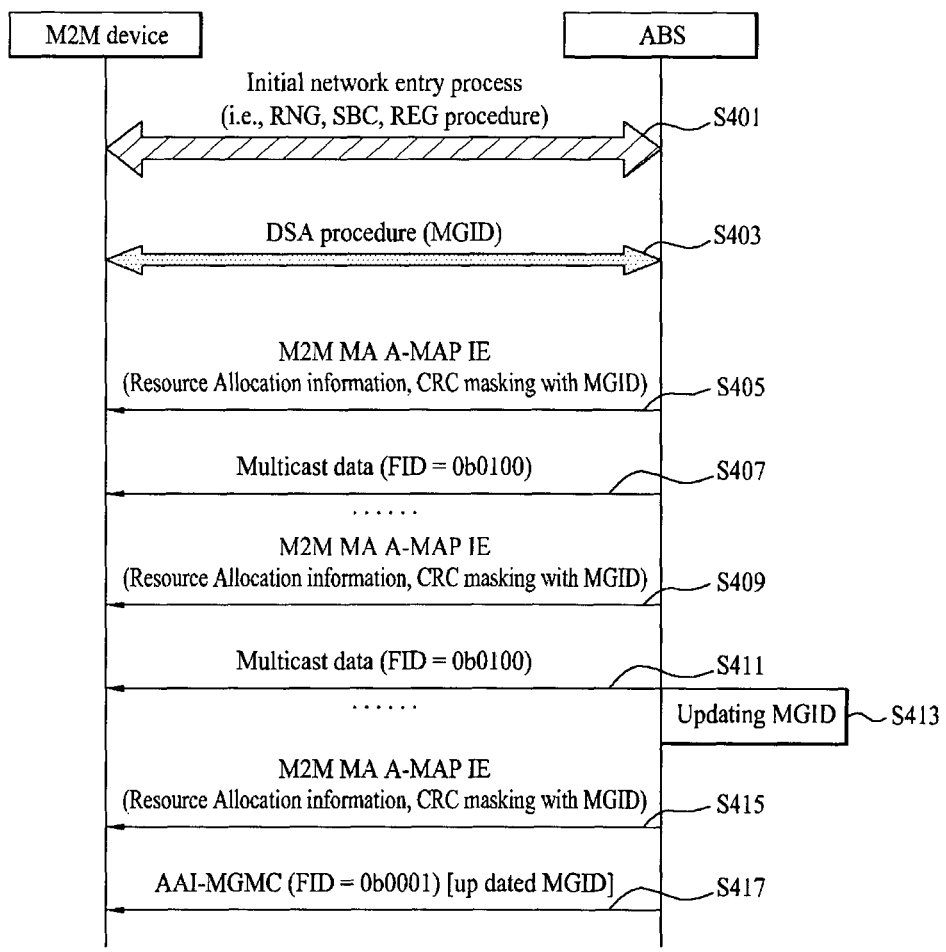
FIG. 4 illustrates another one of many methods for transmitting a MAC control message in a multicast format according to the exemplary embodiment of the present invention.

FIG. 4 illustrates another one of many methods for transmitting a MAC control message in a multicast manner according to the exemplary embodiment of the present invention.

The processes corresponding to step S401 to step S411 are very similar to the processes corresponding to step S301 to step S317. Therefore, reference may be made to the description of FIG. 3 for detailed description of the processes corresponding to step S401 to step S411. However, since the M2M device of FIG. 4 is currently being operated in a general mode, the M2M device does not perform the processes corresponding to step S305 step S307. More specifically, the M2M device does not operate in the idle mode and is in a Connected State with the base station.

After the base station transmits the multicast data to the M2M device, a multicast group identifier may be required to be updated (S413).

Therefore, in order to transmit the updated MGID to the M2M devices belonging to the corresponding multicast group, the base station is required to transmit an AAI-MGMC message including the newly updated MGID to the M2M device. In order to do so, the base station may transmit an M2M MA A-MAP IE including the resource assignment information, which indicates the resource region for transmitting the multicast MAC control message (i.e., AAI-MGMC) respective to the M2M devices, to the M2M device (S415).

In step S415, the M2M MA A-MAP IE may have the format described in Table 5, and may be masked to the 16-bit CRC including the masking code described in Table 9. For example, in the 16-bit CRC, the masking prefix may be set to 0b0, the type indicator may be set to 0b100, and the masking code may be set to an M2M group identifier (MGID) to which the M2M device belongs.

In the Connected state, by de-masking the CRC, the M2M device, which has received the M2M MA A-MAP IE of step S415, may verify based upon the MGID included in the CRC that the corresponding IE belongs to the M2M device. Accordingly, the M2M device may decode the M2M MA A-MAP IE and may receive the AAI-MGMC message, which corresponds to a MAC control message, through an assignment zone (or region) indicated by a broadcast assignment information being included in the M2M MA A-MAP IE (S417).

In step S417, the AAI-MGMC message, which corresponds to the MAC control message, may be transmitted by using the MAC PDU. At this point, a multicast control FID, which is included in the MAC header (e.g., AGMH) of the MAC PDU, may indicate that the corresponding MAC PDU includes a MAC control message respective to the M2M device, and may also indicate whether or not a payload of the corresponding MAC PDU is encrypted.

If a general user equipment receives the M2M MA A-MAP IE of step S417, since the general user equipment does not have an MGID, the general user equipment is incapable of de-masking the corresponding M2M MA A-MAP IE. Therefore, the general user equipment may not decode the M2M MA A-MAP IE and the general user equipment may not receive the AAI-MGMC message, too.

Figure 5:
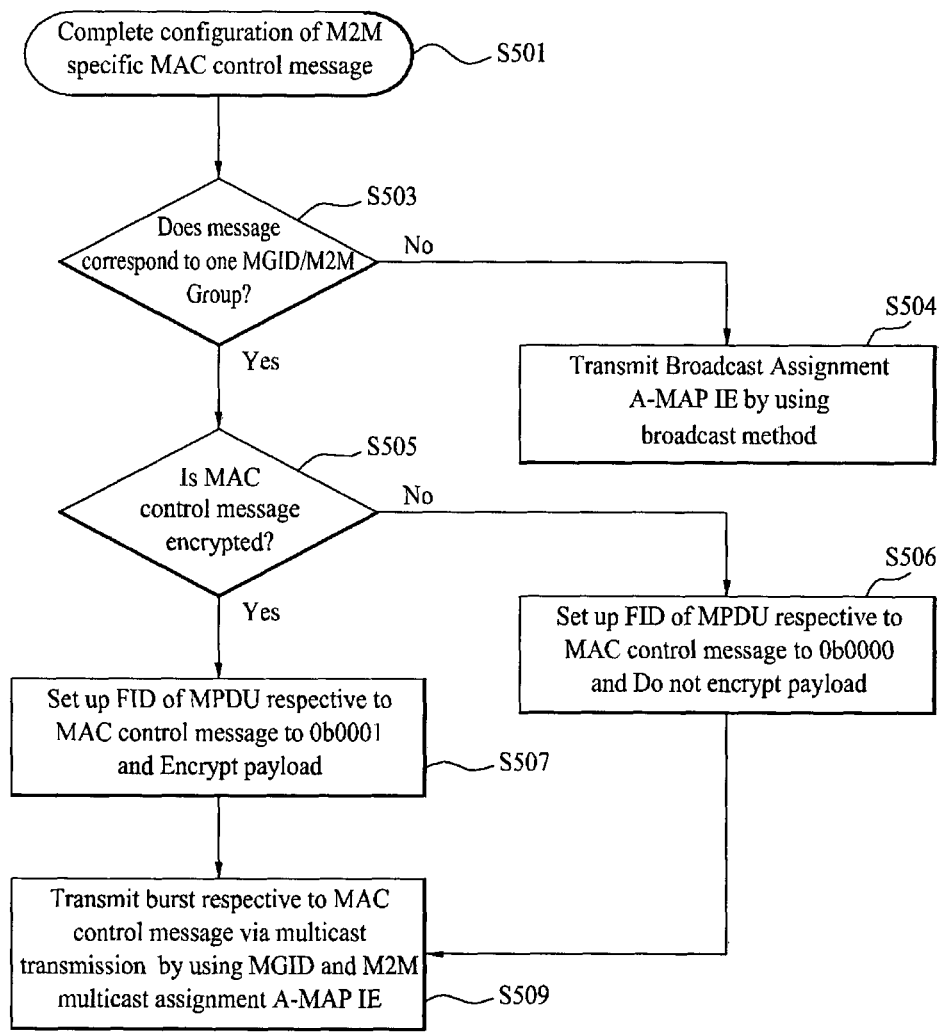
FIG. 5 illustrates a flow chart showing a process of having a base station transmit a MAC control message in a multicast format according to the exemplary embodiment of the present invention.

FIG. 5 illustrates a flow chart showing a process of having a base station transmit a MAC control message in a multicast manner according to the exemplary embodiment of the present invention.

FIG. 5 may be applied to the exemplary embodiments of the present invention described with reference to FIG. 3 and FIG. 4. More specifically, the base station according to the exemplary embodiments described in FIG. 3 and FIG. 4 may transmit the MAC control message to the M2M device through the process of FIG. 5.

Referring to FIG. 5, an M2M specific MAC control message is configured in the base station (S501).

The base station determines whether or not the corresponding MAC control message corresponds to a MAC control message respective to a single M2M group, which is specified by a single MGID (S503).

If the corresponding MAC control message does not correspond to an M2M group managed by the base station, the base station may transmit an assignment region, to which the MAC control message is being transmitted, by using a BA A-MAP IE, and the base station may transmit the MAC control message through the corresponding assignment region by using a broadcast method (S504).

In step S503, if the corresponding MAC control message is for the M2M group, which is managed by the base station, the base station determined whether or not the MAC control message has been encrypted (S505).

In step S505, when the MAC control message is not required to be encrypted, the base station may set to FID of the MAC PDU for the MAC control message to 0b0000, and, then, the base station does not encrypt the payload of the MAC PDU (S506). Subsequently, the base station masks the M2M MA A-MAP IE, which includes the resource assignment information for the MAC control message, by using the MGID and transmits the MAC control message by using a multicast manner (S509).

In step S505, when it is determined that the MAC control message is required to be encrypted, the base station may set to FID of the MAC PDU for the MAC control message to 0b0001, and, then, the base station encrypts the payload of the MAC PDU (S507). Subsequently, the base station masks the M2M MA A-MAP IE, which includes the resource assignment information for the MAC control message, by using the MGID and transmits the MAC control message by using a multicast manner (S509).

Figure 6:
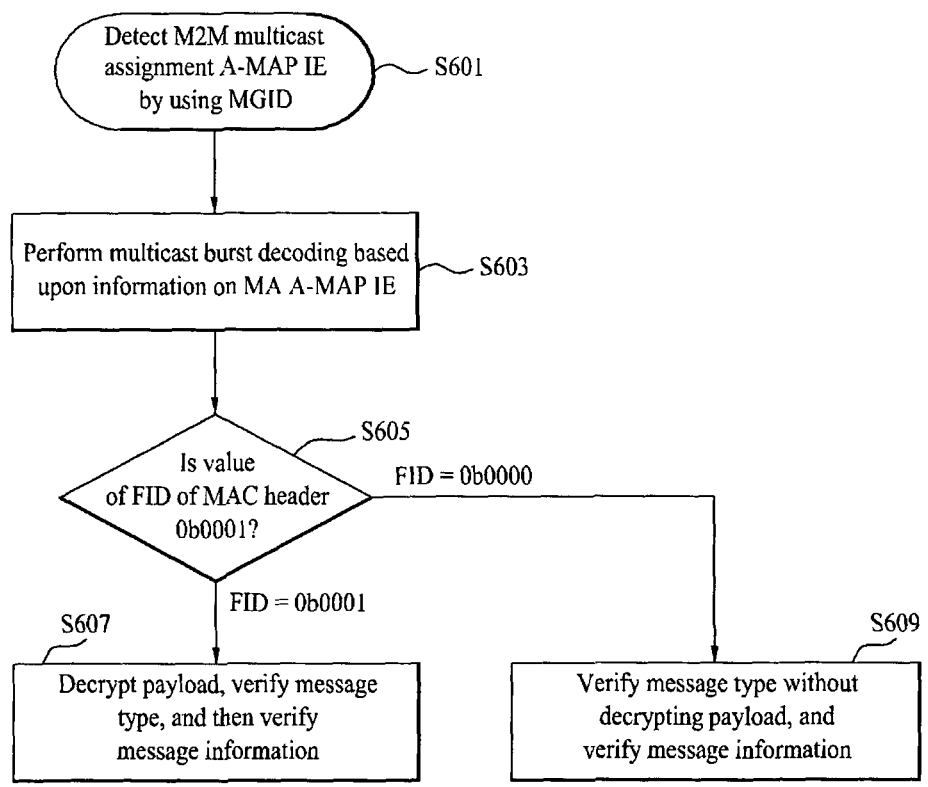
FIG. 6 illustrates a flow chart showing a process of having an M2M device receive a MAC control message in a multicast format according to the exemplary embodiment of the present invention.

FIG. 6 illustrates a flow chart showing a process of having an M2M device receive a MAC control message in a multicast format according to the exemplary embodiment of the present invention.

FIG. 6 may be applied to the exemplary embodiments of the present invention described with reference to FIG. 3 and FIG. 4. More specifically, the M2M device according to the exemplary embodiments described in FIG. 3 and FIG. 4 may receive the MAC control message to the M2M device through the process of FIG. 6.

Referring to FIG. 6, by de-masking the M2M MA A-MAP IE by using the MGID assigned to the M2M device, the M2M device detects the M2M MA A-MAP IE that is being transmitted to the M2M device itself (S601).

The M2M device may decode a multicast burst based upon resource assignment information included in the M2M MA A-MAP IE. More specifically, the M2M device may receive a MAC PDU including a MAC control message, which is multicast through the assignment region that is indicated by the resource assignment information (S603).

At this point, based upon the FID included in the MAC PDU, the M2M device may verify whether or not the corresponding MAC PDU is a multicast MAC control message. For example, the M2M device determines whether the multicast control FID is assigned with a value of 0b0001 or 0b0000 (S605).

If the FID is assigned with the value of 0b0001, the FID may indicate that the corresponding MAC control message belongs to the M2M device and that a payload of the MAC PDU has been encrypted. Therefore, the M2M device performs a de-encryption process on the payload of the MAC PDU. Thereafter, the M2M device may verify a message type, and, then, the M2M device may verify the information included in the MAC control message (S607).

If the FID is assigned with the value of 0b0000, the FID may indicate that the corresponding MAC control message belongs to the M2M device and that a payload of the MAC PDU has not been encrypted. Therefore, the M2M device may verify the information included in the MAC control message without having to perform the de-encryption process (S609).

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described embodiments of the present invention may be applied to a wide range of wireless access systems. Examples of the diverse wireless access systems may include 3GPP (3rd Generation Partnership Project) systems, 3GPP2 systems, and/or IEEE 802.xx (Institute of Electrical and Electronic Engineers 802) systems, and so on. In addition to the diverse wireless access systems, the exemplary embodiments of the present invention may also be applied to all technical fields applying and adopting the diverse wireless access systems.

The invention claimed is:

1. A method for receiving a Medium Access Control (MAC) control message for an M2M device in a wireless access system, the method comprising:
   receiving a paging message including an M2M Group Identifier (MGID) and an indicator, wherein the M2M Group Identifier (MGID) identifies an M2M group to which the M2M device belongs and the indicator indicates a multicast data transmission for the M2M device;
   receiving an M2M multicast assignment A-MAP information element (M2M MA A-MAP IE) including resource assignment information, wherein the resource assignment information indicates a resource region to which the MAC control message for the M2M device is being transmitted; and
   receiving a Medium Access Control Protocol Data Unit (MAC PDU) including the MAC control message, the MAC control message being multicast through the resource region indicated by the resource assignment information, when a Cyclic Redundancy Check (CRC) bit being masked to the M2M MA A-MAP IE includes the MGID,
   wherein the CRC bit being masked to the M2M MA A-MAP is configured with a masking prefix, a type indicator, and the MGID, and
   wherein a MAC header of the MAC PDU includes a first flow identifier indicating whether a payload of the MAC PDU is encrypted.

2. The method of claim 1, wherein the first flow identifier further indicates that the MAC PDU is a MAC control message being transmitted as multicast manner, and
   the first flow identifier is set to 0b0000 or 0b0001 in order to indicate whether the encryption has been performed.

3. The method of claim 1, further comprising:
   receiving a MAC PDU accompanying multicast data, after receiving the paging message,
   wherein the MAC PDU includes a second flow identifier indicating that the MAC PDU is the multicast data and the second flow identifier is assigned with a value of 0b0100.

4. The method of claim 1, wherein the MAC control message is a multicast transmission end indicator (AAI-MTE-IND) message indicating a transmission end of the multicast data.

5. The method of claim 1, wherein the M2M device further performs a process of decrypting the MAC PDU, when the first flow identifier indicates that the MAC PDU has been encrypted.

6. A method for transmitting a Medium Access Control (MAC) control message for an M2M device in a wireless access system, the method comprising:
   transmitting a paging message including an M2M Group Identifier (MGID) and an indicator, wherein the M2M Group Identifier (MGID) identifies an M2M group to which the M2M device belongs, and wherein the indicator indicates a multicast data transmission for the M2M device;
   transmitting an M2M multicast assignment A-MAP information element (M2M MA A-MAP IE) including resource assignment information, wherein the resource assignment information indicates a resource region to which the MAC control message for the M2M device is being transmitted; and
   transmitting a Medium Access Control Protocol Data Unit (MAC PDU) including the MAC control message, the MAC control message being multicast through the resource region indicated by the resource assignment information, when a Cyclic Redundancy Check (CRC) bit being masked to the M2M MA A-MAP IE includes the MGID,
   wherein the CRC bit being masked to the M2M MA A-MAP is configured with a masking prefix, a type indicator, and the MGID, and
   wherein a MAC header of the MAC PDU includes a first flow identifier indicating whether a payload of the MAC PDU is encrypted.

7. The method of claim 6, wherein the first flow identifier further indicates that the MAC PDU is a MAC control message being transmitted as multicast manner, and
   the first flow identifier is set to 0b0000 or 0b0001 in order to indicate whether the encryption has been performed.

8. The method of claim 6, further comprising:
   transmitting a MAC PDU accompanying multicast data, after transmitting the paging message,
   wherein the MAC PDU includes a second flow identifier indicating that the MAC PDU is the multicast data and the second flow identifier is assigned with a value of 0b0100.

9. The method of claim 6, wherein the MAC control message is a multicast transmission end indicator (AAI-MTE-IND) message indicating a transmission end of the multicast data.

10. The method of claim 6, wherein the M2M device further performs a process of decrypting the MAC PDU, when the first flow identifier indicates that the MAC PDU has been encrypted.

11. A M2M device for receiving a Medium Access Control (MAC) control message in a wireless access system, the M2M device comprising:
   a receiver; and
   a processor supporting the reception of the MAC control message,
   wherein the M2M device is configured to:
   receive a paging message including an M2M Group Identifier (MGID) and an indicator through the receiver, wherein the M2M Group Identifier (MGID) identifies an M2M group to which the M2M device belongs and the indicator indicates a multicast data transmission for the M2M device;
   receive an M2M multicast assignment A-MAP information element (M2M MA A-MAP IE) including resource assignment information through the receiver, wherein the resource assignment information indicates a resource region to which the MAC control message for the M2M device is being transmitted; and receive a Medium Access Control Protocol Data Unit (MAC PDU) including the MAC control message through the receiver, the MAC control message being multicast through the resource region indicated by the resource assignment information, when a Cyclic Redundancy Check (CRC) bit being masked to the M2M MA A-MAP IE includes the MGID, wherein the CRC bit being masked to the M2M MA A-MAP is configured with a masking prefix, a type indicator, and the MG ID, and wherein a MAC header of the MAC PDU includes a first flow identifier indicating whether a payload of the MAC PDU is encrypted.

12. The M2M device of claim 11, wherein the first flow identifier further indicates that the MAC PDU is a MAC control message being transmitted as multicast manner, and
the first flow identifier is set to 0b0000 or 0b0001 in order to indicate whether the encryption has been performed.

13. The M2M device of claim 11, further receiving a MAC PDU accompanying multicast data, after receiving the paging message, and
wherein the MAC PDU includes a second flow identifier indicating that the MAC PDU is the multicast data and the second flow identifier is assigned with a value of 0b0100.

14. The M2M device of claim 11, wherein the MAC control message is a multicast transmission end indicator (AAI-MTE-IND) message indicating a transmission end of the multicast data.

15. The M2M device of claim 11, wherein the M2M device further performs a process of decrypting the MAC PDU, when the first flow identifier indicates that the MAC PDU has been encrypted.

16. A base station for multicasting a Medium Access Control (MAC) control message for an M2M device in a wireless access system, the base station comprising:
a transmitter; and
a processor supporting the transmission of the MAC control message,
wherein the base station is configured to:
transmit a paging message including an M2M Group Identifier (MGID) and an indicator through the transmitter, wherein the M2M Group Identifier (MGID) identifies an M2M group to which the M2M device belongs, and wherein the indicator indicates a multicast data transmission for the M2M device;

transmit an M2M multicast assignment A-MAP information element (M2M MA A-MAP IE) including resource assignment information through the transmitter, wherein the resource assignment information indicates a resource region to which the MAC control message for the M2M device is being transmitted; and transmit a Medium Access Control Protocol Data Unit (MAC PDU) including the MAC control message through the transmitter, the MAC control message being multicast through the resource region indicated by the resource assignment information, when a Cyclic Redundancy Check (CRC) bit being masked to the M2M MA A-MAP IE includes the MGID, wherein the CRC bit being masked to the M2M MA A-MAP is configured with a masking prefix, a type indicator, and the MGID, and wherein a MAC header of the MAC PDU includes a first flow identifier indicating whether a payload of the MAC PDU is encrypted.

17. The base station of claim 16, wherein the first flow identifier further indicates that the MAC PDU is a MAC control message being transmitted as multicast manner, and
the first flow identifier is set to 0b0000 or 0b0001 in order to indicate whether the encryption has been performed.

18. The base station of claim 16, further comprising:
transmitting a MAC PDU accompanying multicast data, after transmitting the paging message,
wherein the MAC PDU includes a second flow identifier indicating that the MAC PDU is the multicast data and the second flow identifier is assigned with a value of 0b0100.

19. The base station of claim 16, wherein the MAC control message is a multicast transmission end indicator (AAI-MTE-IND) message indicating a transmission end of the multicast data.

20. The base station of claim 16, wherein the M2M device further performs a process of decrypting the MAC PDU, when the first flow identifier indicates that the MAC PDU has been encrypted.

* * * * *